United States Patent
Kaneko et al.

(10) Patent No.: US 6,800,388 B2
(45) Date of Patent: Oct. 5, 2004

(54) CATALYST COMPOSITION

(75) Inventors: Hiroaki Kaneko, Kanagawa-ken (JP); Fumihiro Haga, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 84 days.

(21) Appl. No.: 09/780,617

(22) Filed: Feb. 12, 2001

(65) Prior Publication Data

US 2001/0053467 A1 Dec. 20, 2001

(30) Foreign Application Priority Data

Feb. 16, 2000 (JP) .................................. 2000-038461

(51) Int. Cl.[7] .......................... H01M 8/06; H01M 8/12
(52) U.S. Cl. ........................................ 429/19; 429/40
(58) Field of Search ........................ 429/17, 19, 40; 502/303, 304, 525; 423/247

(56) References Cited

U.S. PATENT DOCUMENTS

| | | | | |
|---|---|---|---|---|
| 4,126,580 A | * | 11/1978 | Lauder ........................ | 502/303 |
| 4,321,250 A | * | 3/1982 | Hart ............................. | 423/652 |
| 5,964,991 A | * | 10/1999 | Kawasaki et al. ........... | 204/282 |
| 6,165,633 A | * | 12/2000 | Negishi ....................... | 429/17 |

FOREIGN PATENT DOCUMENTS

| | | | |
|---|---|---|---|
| JP | 63-302950 A2 | * | 12/1988 |
| JP | 8-196907 | | 8/1996 |
| WO | WO 97/42495 | * | 11/1997 |

OTHER PUBLICATIONS

Caplus Abstract for JP-63-302950-A2 (1989). No month available.*

* cited by examiner

*Primary Examiner*—Susy Tsang-Foster
(74) *Attorney, Agent, or Firm*—Foley & Lardner LLP

(57) ABSTRACT

A catalyst composition contains a perovskite composite oxide of the type expressed by a rational formula $ABO_3$, wherein A consists of two types of constituent elements of A' and A" and B consists of two types of constituent elements of B' and B", and the perovskite composite oxide is expressed by a general formula $A'_{1-x}A''_xB'_{1-y}B''_yO_3$. The A' is La or Ce, the A" is at least one element selected from the group consisting of La, Ca, Sm, Ce, Sr, Ba and Pr, the B' is at least one type element selected from the group consisting of Co, Fe, Mn and Gd, and the B" is any one type of a noble metal such as Ru, Rh, Pd, Pt, or the like. This catalyst composition can be employed as a reforming catalyst of the alcohol or the hydrocarbon-based gas to produce hydrogen gas for a fuel cell, or as an electrode catalyst.

1 Claim, 4 Drawing Sheets

0.1%O₂/N₂ → ← AIR 0.1%O₂/N₂ → ← AIR

CATALYST COMPOSITION

BACKGROUND OF THE INVENTION

1. Field of the Invention

The present invention relates to catalyst composition and a method of manufacturing the same and, more particularly, catalyst composition employing a perovskite composite oxide. Also, the present invention relates to a reforming catalyst for a fuel cell as an application of the catalyst composition, an electrode catalyst for a solid oxide electrolyte fuel cell, etc.

2. Description of the Related Art

In general, as the catalyst composition, there are employed many oxide supports such as various alumina, zirconia, etc. that are impregnated with the catalyst activating substance such as a noble metal, etc.

For example, as the methanol reforming catalyst employed as the fuel cell, a Cu—Zn based catalyst is known which contains the zirconia ($ZrO_2$) support impregnated with Cu as the catalyst activating substance. The steam reforming reaction of the methanol is given by following Formula (1), and generates carbon dioxide ($CO_2$) and hydrogen ($H_2$) with the intervention of the reforming catalyst.

$$CH_3OH + H_2O \rightarrow CO_2 + 3H_2 \qquad (1)$$

Also, in Patent Application Publication H8-196907 published in 1996, a ruthenium catalyst that accelerates the steam reforming reaction by using the hydrocarbon gas such as butane, etc. is disclosed. This ruthenium catalyst is formed by impregnating zirconium (Zr), rare earth metals (Y, La), alkaline earth metals (Mg, Ca), and ruthenium (Ru) into various oxide supports such as alumina, silica, zirconia, etc., and then exhibits the high activity at the low steam/carbon ratio.

SUMMARY OF THE INVENTION

In the Cu—Zn reforming catalyst employed in the fuel cell, the steam reforming reaction given by Formula (1) as well as the methanol decomposition reaction given by following Formula (2) is accelerated to thus generate the carbon monoxide (CO).

$$CH_3OH \rightarrow CO + 2H_2 \qquad (2)$$

Since the generated CO serves as the degradation factor of the fuel cell, the high selectivity in reaction to suppress the CO generation low is required of the reforming catalyst.

However, in order to get the high selectivity in reaction by using the Cu—Zn based reforming catalyst while suppressing the CO generation, the catalyst must be employed in the relatively narrow temperature range (300° C.±20° C.). If the catalyst temperature exceeds 320° C., the methanol decomposition reaction proceeds abruptly to generate CO and cause the growth of the grain diameter of Cu. Thus, the performance of the catalyst itself is deactivated.

Also, the above ruthenium catalyst (Zr—(Y, La)—(Mg, Ca)—Ru) needs the high temperature of more than 650° C., at which such catalyst exhibits the activity, and the high steam/carbon ratio of 3.0 to 1.85. Therefore, it is difficult to apply such catalyst to the fuel cell system equipped onto automobiles.

Meanwhile, recently there are many cases where the pre-thermal reforming reaction is employed to accelerate the steam reforming reaction given by Formula (1) as well as the partial oxidation reaction given by Formula (3) by adding the oxygen gas to the reforming reaction gas. Accordingly, the stability at the high temperature and oxidizing atmosphere is also required of the reforming catalyst.

$$CH_3OH + \tfrac{1}{2}O_2 \rightarrow CO_2 + 2H_2 \qquad (3)$$

It is a first object of the present invention to provide high activity/high selectivity catalyst composition capable of maintaining its high selectivity with the good stability even in the high temperature and oxygen sufficient atmosphere, and a method of manufacturing the same.

Also, it is a second object of the present invention to provide a reforming catalyst for a fuel cell, an electrode catalyst, a solid electrode type fuel cell, a reformer, and a fuel cell system, all using the above catalyst composition.

In order to achieve the above objects of the present invention, a catalyst composition of the present invention contains a perovskite composite oxide of the type expressed by a rational formula $ABO_3$. Also, this rational formula $ABO_3$ is expressed by a formula $A'_{1-x}A''_x B'_{1-\alpha}B''_y O_3$. Where the A" is La and/or Ce, the A" is at least one element selected from the group consisting of La, Ca, Sm, Ce, Sr, Ba and Pr, the B' is at least one element selected from the group consisting of Co, Fe, Mn and Gd, and the B" is at least one element of noble metals. In addition, preferably the noble metal in B" is at least one elements selected from the group consisting of Ru, Rh, Pd, and Pt.

The above catalyst composition of the present invention is the perovskite composite oxide expressed by the formula $A'_{1-x}A''_x B'_{1-y}B''_y O_3$ and is material that is stable in the high temperature and oxidizing atmosphere. This catalyst composition has a function as the support and has an active catalytic function in itself since it contains the noble metal with an active catalytic function in the B site of the crystal structure. Thus, this catalyst composition can assure the high dispersibility and stability to thus exhibit the higher catalytic function than the case where the catalyst activating substance is simply impregnated. Also, this catalyst composition can exhibit the high electro-mobility based on the lattice defect in the A site and thus has a function as the electrode. These functions can be improved by selecting above optimal elements in respective sites.

Accordingly, the above catalyst composition of the present invention may be employed as the catalyst in various applications. In particular, this catalyst composition may be employed as the reforming catalyst to produce the hydrogen gas for the fuel cell. Also, since this catalyst composition has the catalytic function and the electro-mobility together, it can be employed as the electrode catalyst of the fuel cell.

In order to produce the catalyst composition of the present invention, first a mixed solution is prepared by mixing chloride, nitrate, or carbonate of La or Ce, at least one type of chloride, nitrate, and carbonate of at least one element selected from the group consisting of La, Ca, Sm, Ce, Sr, Ba, and Pr, at least one type of nitrate and carbonate of at least one element selected from the group consisting of Co, Fe, Mn, and Gd, and at least one type of chloride and nitrate of at least one element selected from the group consisting of Ru, Rh, Pd and Pt. Then, a monooxy carbonate is prepared as an intermediate product by reacting the mixed solution with a carbonate based on a hydrothermal reaction. Then, this monooxy carbonate is heated in an oxygen atmosphere.

A reforming catalyst of the present invention comprises a honeycomb substrate, and the above catalyst composition coated on the honeycomb substrate and set forth in the present invention.

An electrode catalyst for a fuel cell of the present invention comprises the above catalyst composition set forth in the present invention.

A solid oxide electrolyte fuel cell of the present invention comprises a solid electrolyte substrate, the electrode catalyst containing the catalyst composition set forth in the present invention adhered onto one surface of the solid electrolyte substrate and an air electrode adhered onto other surface of the solid electrolyte substrate.

A reformer of the present invention for reforming a fuel gas, comprises a gas inlet port, a reactor vessel in which the reforming catalyst containing the catalyst composition set forth in the present invention is provided to its inside and which causes a reforming reaction of a gas supplied from the gas inlet port, and a gas outlet port of a gas reformed by the reactor vessel.

Also, a reforming apparatus of the present invention, comprises a fuel gas supply source, an oxygen supply source, a steam supply source, a reformer set forth in the present invention, and pipings for supplying a fuel gas, an oxygen, and a steam supplied from respective supply sources to the reformer.

In addition, a fuel cell system of the present invention comprises a reforming apparatus set forth in the present invention, a fuel cell, pipings for supplying a gas reformed by the reforming apparatus to the fuel cell, and pipings for supplying a gas containing oxygen to the fuel cell.

DESCRIPTION OF THE PREFERRED EMBODIMENTS

Figure 1A:
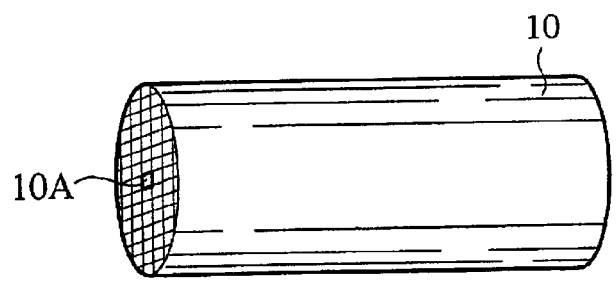
FIG. 1A is a perspective view showing a reforming catalyst according to an embodiment of the present invention, in which catalyst composition is coated on respective inner walls of a monolithic substrate.

Catalyst composition according to an embodiment of the present invention is the perovskite composite oxide of the type expressed by the rational formula $ABO_3$ wherein A consists of two type constituent elements A' and A" and B consists of two type constituent elements B' and B", and contains the perovskite composite oxide expressed by the general formula $A'_{1-x}A''_{x}B'_{1-y}B''_{y}O_3$.

The perovskite composite oxide expressed by the above general formula $A''_{1-x}A''_{x}B'_{1-y}B''_{y}O_3$ has the ionic conductivity. In addition, assume that A' is La and/or Ce, A" is at least one type selected from the group consisting of La, Ca, Sm, Ce, Sr, Ba and Pr, B' is at least one type selected from the group consisting of Co, Fe, Mn and Gd, and B" is the noble metal.

In this manner, if elements on respective sites of the perovskite composite oxide are optimally selected, the catalyst composition according to the present embodiment makes it possible to effectively control the lattice defect on the A site, that enhance the ionic conductivity, and the valence of the noble metal as the element on the B site, that makes an important contribution to a catalytic function, and also achieve the improvement of the ionic conductivity and control the improvement of the catalytic function.

As a result, the catalyst composition according to the present embodiment can provide the catalyst composition having a wide use. Also, since the catalyst composition according to the present embodiment has high durability against the oxidizing atmosphere, it can be used as the reforming catalyst for the fuel cell that can be employed in the steam reforming reaction and the partial oxidation reaction. In addition, the catalyst composition according to the present embodiment can be used as the fuel reforming catalyst that operates at the low steam/carbon ratio. Further, since the catalyst composition according to the present embodiment has the ionic conductivity, it can be used as the catalyst electrode of the fuel cell.

In this case, it is preferable that at least one type selected from the group consisting of Ru, Rh, Pd and Pt, for example, should be employed as the noble metal arranged on the B" site.

Also, preferably x of the above Formula expressing the perovskite composite oxide should satisfy $0.1 < x \leq 0.5$ and y should satisfy $0.05 < y \leq 1$.

A substitution amount x of the element arranged on the A" site is $0.1 \leq x \leq 0.5$. In order to stabilize the structure by introducing necessary lattice defect, it is preferable that the substitution amount x should be set in the range of $0.1 \leq x \leq 0.3$.

Also, a substitution amount y on the B" site is $0.05 < y \leq 1$. In order to enhance the reactivity of the B site element, it is preferable that the substitution amount y should be set in the range of $0.2 \leq y \leq 0.5$.

If the mole ratio of respective metals on the A site of the perovskite composite oxide is changed, the valence of the B site metal is controlled correspondingly. Also, since the lattice defect is introduced into the A site by adjusting amounts of respective elements arranged on the A (A" and A") site and thus the oxygen discharging/absorbing capability is improved, reduction in the reaction starting temperature is attained.

In addition, the heat resistance and the durability are improved by the sintering suppressing effect of the perovskite composite oxide itself. Also, since the lattice defect on the A site improves the oxygen discharging/absorbing capability, the internal resistance at the interface between the solid electrolyte and the electrode catalyst is reduced and thus the lower operation temperature is achieved.

Further, the lattice defect on the A site increases the absorbed oxygen that is important to the movement of the oxygen ion. In the absorbed oxygen, there contained α-oxygen and β-oxygen. The α-oxygen is desorbed in the wide temperature range lower than 800° C. and adsorbed to oxygen vacancies produced by the partial substitution of the A site ion, and the β-oxygen is desorbed around 20° C. like the sharp peak and corresponds to the reduction to the lower electron of the B site atom. Because of the presence of two type oxygens, the mobility of the oxygen ion is improved in the wide temperature range.

If all constituent elements of the perovskite composite oxide in the present embodiment are combined together, the above function is fulfilled to its maximum. Even if at least a part of them constitutes the complex, the above function is achieved.

Respective constituent elements of the perovskite composite oxide are not separated into respective oxides but still remain as the composite oxide after using for a long time under the high heat condition. This situation can be checked by the X-ray diffraction measurement, for example.

A minute amount of impurity may be contained in respective constituent elements of the perovskite composite oxide unless such amount prevents the above function. For example, there are strontium (Sr) contained in barium, Ce, Nd, Pr contained in La, La, Nd, Pr contained in Ce, La, Ce, Nd contained in Pr, and the like.

The perovskite composite oxide is contained in the catalyst composition by 50 to 100 wt %, preferably 80 to 95 wt %. The catalytic performance can be exhibited satisfactorily by setting an amount of the oxide to such range.

Further, alumina or silica in addition to the perovskite composite oxide may be contained in the catalyst composition. The alumina or silica has functions for suppressing the aggregation of the perovskite composite oxide caused by the heat and suppressing reduction in the catalytic characteristic caused by the high temperature/long time use. An amount of alumina or silica contained in the catalyst composition is 5 to 20 wt %, preferably 5 to 15 wt %. The thermally stable catalyst is obtained without the reduction in the catalytic characteristic by setting an amount of the alumina or silica to such range.

In order to produce the perovskite composite oxide according to the present embodiment, the solid-state reaction or the coprecipitation method may be used. If the solid-state reaction is employed, first the nitrate, the acetate, the carbonate, the citrate, the hydrochloride, etc. as respective constituent elements of the composite oxide are mixed at the composition ratio of the desired composite oxide and then temporarily baked. Then, the temporarily baked product is ground and then burned by the heating process. If the coprecipitation method is used, the nitrate, the acetate, the carbonate, the citrate, etc. as respective constituent elements of the composite oxide are mixed at the composition ratio of the desired composite oxide and then dissolved into the water. Then, the precipitate is produced by dropping the alkaline solution such as $NH_4OH$, $NH_3CO_3$, etc., as occasion demands, and then filtrated. Then, the precipitate is dried and baked.

If the perovskite composite oxide is produced by using the nitrate as the starting material, for example, first the carbonate is prepared by adding the nitrate into the ammonium bydrogencarbonate solution, and then the monooxy carbonate is synthesized by the hydrothermal reaction in the heated steam. Then, this monooxy carbonate is baked in the air.

Also, if the perovskite composite oxide is produced by using the carbonate as the starting material, for example, first the carbonate is dispersed into the pure water, and then the monooxy carbonate is synthesized by the hydrothermal reaction in the heated steam. Then, this monooxy carbonate is baked in the air.

More particularly, if the nitrate is used as the starting material, first La nitrate and/or Ce nitrate, at least one type selected from the group consisting of La nitrate, Ca nitrate, Sm nitrate, Ce nitrate, Sr nitrate, Ba nitrate and Pr nitrate, and at least one type selected from the group consisting of Co nitrate, Fe nitrate, Mn nitrate and Gd nitrate are weighed respectively and then mixed at the stoichiometric ratio of the desired composite oxide, and then this mixture is dissolved into the pure water. In addition, the ruthenium nitrate and/or rhodium nitrate solution is added to this solution and then sufficiently stirred/mixed to prepare the mixed solution.

Then, the above mixed solution is added into an autoclave while dispersing/diffusing previously the ammonium hydrogencarbonate by the pure water. After the whole quantity is added, the steam of 120° C. is thrown into the autoclave in the tightly closed state. The steam having the steam pressure of about 2 kg/cm$^3$ is supplied into the autoclave such that the internal pressure of the autoclave reaches 1.1 kg/cm$^2$. The reaction is continued under this state for 2 to 3 hours, and then this reaction is finished after about 0.5 hour after the insertion of the steam is not needed. Where the state in which the insertion of the steam is not needed signifies such a state that change in the internal pressure has been suppressed within ±0.1 kg/cm$^2$. After the end of the reaction, the slurry-like hydrate is filtrated, cleaned, dried, and then baked at 400 to 600° C. in the air to thus get the perovskite composite oxide.

Also, even when the chloride is used as the starting material, the perovskite composite oxide is produced by processes similar to the case of the above nitrate.

In addition, more particularly, if the carbonate is used as the starting material, first La carbonate and/or Ce carbonate, at least one type selected from the group consisting of La carbonate, Ca carbonate, Sm carbonate, Ce carbonate, Sr carbonate, Ba carbonate and Pr carbonate, and at least one type selected from the group consisting of Co carbonate, Fe carbonate, Mn carbonate and Gd carbonate are weighed respectively and then mixed at the stoichiometric ratios of the desired composite oxide, and then this mixture is dissolved into the pure water. In addition, the ruthenium nitrate and/or rhodium nitrate solution is added to this solution and then sufficiently stirred/mixed to prepare the mixed solution. Then, the above mixed solution is added into the autoclave. After the whole quantity is added, the steam of 120° C. is thrown into the autoclave in the tightly closed state. Subsequently the fabrication is carried out by procedures similar to the case of the above nitrate. After the finish of the reaction, the slurry-like hydrate is filtrated, then cleaned, then dried, and then baked at 400 to 600° C. in the air to thus get the perovskite composite oxide.

Next, the catalyst composition is produced by employing the above resultant perovskite composite oxide. Mixed slurry is prepared by grinding/mixing the resultant perovskite composite oxide powders and nitric acid sol containing alumina or silica in the slurry by 5 to 20 wt %, preferably 5 to 10 wt %, by virtue of a planetary ball mill. It is not preferable to increase the alumina or silica contained amount much more since the reduction in the perovskite component is caused relatively.

By employing the alumina sol or silica sol, the homogeneity and the heat resistance of the crystal structure is improved compared with using the water-soluble salt of the aluminum or silica, and the alumina sol or silica sol has the specific surface area used to hold the perovskite composite oxide in the highly dispersed state is sufficiently assured.

Also, there is another method of obtaining the catalyst composition in which the perovskite composite oxide is highly dispersed. That is, the perovskite composite oxide and the alumina sol or silica sol are dispersed into the water, then pH is adjusted in the range of 7.0 to 9.0 by adding gradually at least one type aqueous solution selected from the group consisting of the aqueous ammonia, the ammonium carbonate, and the ammonia carbonate as the precipitant, and then the residue is dried by removing the water content and then baked.

Because of using the above-mentioned precipitation method by employing the above alumina sol or silica sol as the material compound, the catalyst composition which has the fine porous structure, the large specific surface area of the alumina or silica and also the uniformly dispersed state of the perovskite composite oxide is obtained.

Also, since the alumina sol or silica sol brings a colloid into the unstable colloid state in which the colloid has a size of 5 to 200 μm, the homogeneity and the heat resistance of the crystal structure is improved by using the alumina sol or silica sol whose pH is adjusted to 2.0 to 7.0.

If the above aqueous ammonia or ammonium compound is employed as the precipitant in the above precipitation method, the metal element does not remain when the cleaning of the precipitation cake is incomplete. Also, if the ammonium compound (mainly the ammonium nitrate after the dropping) remains, it is easily decomposed/removed by the later burning. In addition, since the alumina sol is used in place of the ammonium nitrate, the exhaust gas/waste water processing for Nox and the ammonium nitrate derived from the material is extremely reduced when the precipitate is dried/baked.

In executing the above precipitation method, the precipitates of various metallic salts are formed by adjusting pH of the solution in the range of 7.0 to 9.0. The precipitates cannot be sufficiently formed if pH is lower than 7.0, however, a part of precipitated components is redissolved in some cases if pH is higher than 9.0.

The removal of the water content may be executed by the method that is selected appropriately from the well known methods such as the filtration process, the evaporation-to-dryness method, the spray drying method, etc. Such method is not limited particularly in the present invention. However, in order to get the large specific surface area to improve the dispersibility of palladium, it is desired that such removal of the water content should be performed by the spray drier.

The heat treatment method of the alumina or silica into which the perovskite composite oxide is dispersed is not particularly limited. But it is preferable that the heat treatment should be executed at the temperature range of 400 to 700° C. in the air and/or under the air stream, for example, after the immersion/drying. In this way, the catalyst composition of this embodiment is provided.

The fuel reforming catalyst of the present embodiment is produced by employing the above catalyst composition. Preferably, the fuel reforming catalyst should be produced by coating the above catalyst composition on a monolithic substrate. The fuel reforming catalyst of the present invention is obtained by grinding the composite oxide like the slurry, then coating it on the substrate, and then baking it at the temperature of 400 to 900° C.

The grinding method of grinding the composite oxide is not particularly limited, but preferably the aqueous slurry containing the composite oxide is ground by the wet grinding. The apparatus employed in grinding is not particularly limited, and the commercially available ball vibration mill can be used. The desired grain diameter can be obtained by adjusting the ball diameter, the grinding time, the amplitude, and the vibration frequency.

As the substrate, any substrate appropriately selected from the publicly known catalyst substrates may be employed. For example, the honeycomb substrate having the monolithic structure made of refractory material, the metal substrate, and the like may be listed.

The shape of this substrate is not particularly limited. But normally it is preferable to use the substrate having the honeycomb shape. As this honeycomb material, normally the cordierite such as the ceramics, for example, is often employed. The honeycomb made of the metal material such as the ferritic stainless steels may be employed. In addition, the catalyst composition itself may be shaped into the honeycomb shape. If the shape of the catalyst composition is formed like the honeycomb, the contact area between the catalyst and the fuel gas can be increased and the pressure loss can be suppressed.

Figure 1B:
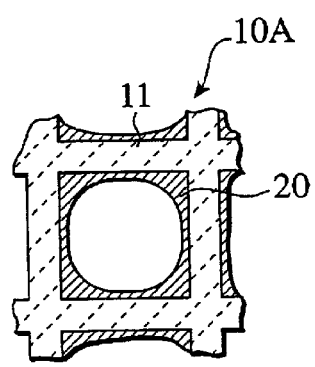
FIG. 1B is an enlarged sectional view showing a cell of the monolithic substrate shown in FIG. 1A.

FIG. 1A shows the reforming catalyst in which the catalyst composition is coated on the honeycomb-like monolithic substrate 10 made of ceramics or metal. The monolithic substrate has a plurality of hollow cells 10A, and the above-mentioned catalyst composition 20 according to the present embodiment is coated on inner walls of respective hollow cells 10A, as shown in FIG. 1B.

Preferably an amount of the catalyst composition adhered to the monolithic substrate 10 should be set to 50 to 400 g per the catalyst composition 1 L. It is preferable to contain catalyst composition component as much as possible from a viewpoint of the catalytic activity and the catalyst lifetime. However, if the coating layer becomes excessively thick, the diffusion of the reaction gases such as HC, CO, NO, etc. becomes worse. Thus, these reaction gases cannot sufficiently come into contact with the catalyst, and the extending effect for the activity is saturated, and the passing resistance of the gases is increased. Accordingly, it is preferable that an amount of the coating layer should be set to 50 to 400 g per the catalyst 1 L.

Figure 2:
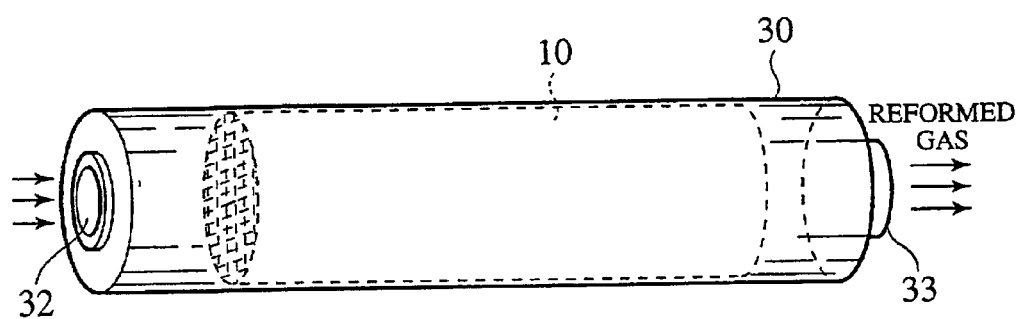
FIG. 2 is a perspective view showing a reactor containing the reforming catalyst.

FIG. 2 shows the reactor according to the present embodiment. As shown in FIG. 2, the reaction gas reformer (reactor) has a reactor vessel 30 in which the reforming reaction is performed and which contains a reforming catalyst 20 shown in FIG. 1B. A gas inlet port 32 for introducing the reaction gases is provided to one end portion of the reactor vessel 30, and a gas outlet port 33 for outputting the reformed gas is provided to the other end.

Any vessel may be employed as the reactor vessel 30 if it can stand the reaction temperature and the pressure in the reaction to carry out the desired reaction. Also, the shape of this vessel is not limited to the pipe shape shown in FIG. 2. Any shape or structure of the vessel may be employed if the reforming catalyst can be filled into the vessel. In addition, the gas inlet port 32 is not limited to a single gas inlet port, and a plurality of gas inlet ports may be provided.

The catalyst composition according to the present embodiment can be used generally in various gas reforming reactions. In particular, the catalyst composition according to the present embodiment may be used as the gas reforming catalyst that is used to extract the hydrogen from the methanol or the hydrocarbon based gas for the fuel cell. For example, if the catalyst composition according to the present embodiment is used as the reforming catalyst for the fuel cell, the hydrocarbon based gas such as the methanol gas or butane ($C_4H_{10}$), the steam ($H_2O$) gas, and the oxygen ($O_2$) gas are introduced as the reaction gases into the reactor vessel 30 via the gas inlet port 32.

Figure 3:
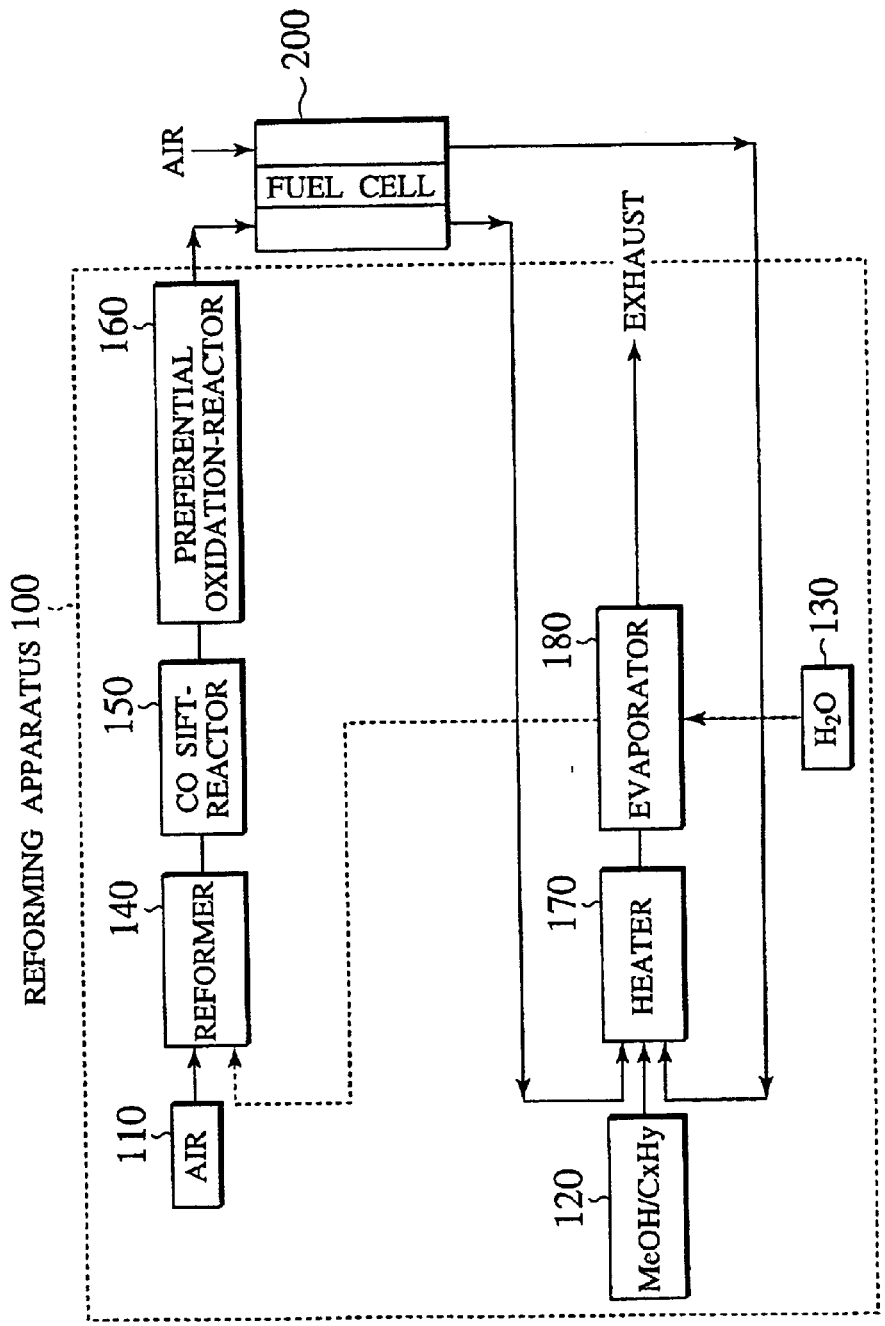
FIG. 3 is a block diagram showing a configuration of an example of a fuel cell system employing the reforming catalyst according to the embodiment of the present invention.

FIG. 3 is a block diagram showing a configuration of an example of a fuel cell system having the reformer shown in FIG. 2. As shown in FIG. 3, respective gases are introduced into a reformer 140 from a supply source 120 of a fuel gas such as the methanol, the hydrocarbon gas, or the like, an oxygen supply source 110, and a steam supply source 130. The methanol is gasified by a heater 170, then mixed with the steam by an evaporator 180, and then introduced into the reformer 140. The air is introduced as the oxygen. These gases are reformed into the hydrogen-containing gas with the intervention of the above methanol reforming catalyst according to the present embodiment.

The reforming catalyst according to the present embodiment can reduce a CO gas in the reforming gas into a low concentration. However it is preferable to reduce the CO concentration in the reforming gas by a CO shift-reactor 150 and a preferential oxidation-reactor 160. Preferably the CO concentration in the reforming gas introduced into a fuel cell 200 should be finally reduced lower than 40 ppm to 50 ppm.

The fuel cell 200 contains cell units each having a structure in which a fuel electrode (negative electrode) and an air electrode (positive electrode) are opposed to each other via an electrolyte. The type of the fuel cell 200 is not particularly restricted. For example, the solid-state polymer electrolyte fuel cell may be employed.

The reforming gas in which CO is reduced is supplied to the fuel electrode, while the air containing the oxygen, for example, is supplied to the air electrode. These gases generate an electromotive force based on the electrochemical reaction and also generate the steam. The exhaust gas containing the hydrogen and the air is returned to the heater 170 and the evaporator 180 and then reused as the fuel gas.

Now the oxygen supply source 110, the fuel gas supply source 120, and the steam supply source 130 are sufficient if they can supply the fuel gas, the oxygen, and the steam respectively. Various vessels and various bombs can be exemplified.

The connection between respective gas supply sources and the reformer 140 and the connection between the reformer 140 and the fuel cell 200 may be provided by appropriate pipings. Various sensors such as the flowmeter, the pressure gauge, the thermometer, etc. and a pressure-supplying means such as the pump, etc. may be provided in the middle of such pipings, and supply of respective materials such as the methanol, etc. are controlled.

In this case, since the partial oxidation reaction is carried out prior to or at the almost same time as the steam reforming reaction, the fuel gas supply path and the oxygen supply path may be joined together on the upstream side of the reformer.

Similarly, the electrode catalyst is formed on the solid electrolyte substrate by coating the slurry containing the catalyst composition according to the present embodiment on a surface of the solid electrolyte substrate and then baking it in the air at 400 to 800° C. This electrode catalyst can maintain the stable performance against the heat cycle caused by repeating the start and the stop of the fuel cell.

Figure 4:
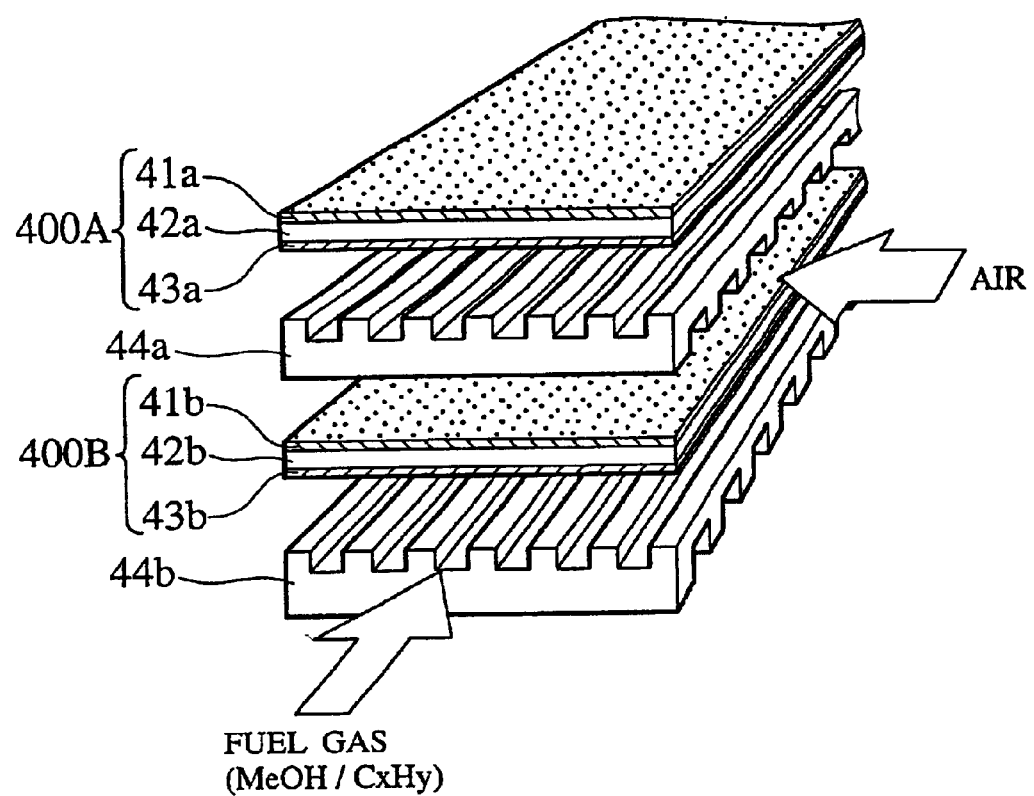
FIG. 4 is a view showing a configuration of SOFC (Solid Oxide Electrolyte Fuel Cell) employing the electrode catalyst reforming catalyst according to the embodiment of the present invention.

FIG. 4 shows a configuration of the solid electrolyte fuel cell having the electrode catalyst using the catalyst composition according to the present embodiment. A flat plate-type solid electrolyte fuel cell in which two fuel cell units 400A, 400B are laminated via separators 44a, 44b is shown herein. The number of laminated layers can be increased as occasion demands. Grooves acting as gas flow paths are provided to the separators 44a, 44b. Since the separators 44a, 44b performs a role as an inter-connector that electrically connects a plurality of cells, material such as lanthanum chromite-based oxide ($LaCrO_3$), etc. having the conductivity is employed.

Air electrodes 41a, 41b are formed on one surface of plate-like solid electrolytes 42a, 42b, and electrode catalysts 43a, 43b acting as the fuel electrode are formed on the other surface. The material employed in the prior art may be used as the solid electrolytes 42a, 42b and the air electrodes. For example, the yttrium-partially stabilized zirconia/cerium (IV) oxide may be exemplified as the solid electrolyte material. Also, lanthanum strontium manganese oxide ($La_{1-x}Sr_xMnO_3$), etc. may be employed as the air electrode material.

The electrode catalysts 43a, 43b are obtained by coating the slurry containing the catalyst composition on the solid electrolyte substrate and then burning it. For example, if the slurry of 10 mg to 50 mg is coated, the thickness of the electrode catalyst may be set to 0.5 to 20 µm after the burning.

In this case, a system substantially similar to that shown in FIG. 3 may be used as a configuration of a fuel cell system employing the solid electrolyte fuel cell. If the fuel electrode is used as the electrode catalyst, the reformer 140, the CO sift-reactor 150, and the preferential oxidation-reactor 160 may be omitted.

Examples and Comparative examples of the reforming catalyst and the electrode catalyst employing the catalyst composition according to the present embodiment will be explained hereinafter.

EXAMPLE #1

In Example 1, the nitrates of respective elements were mixed to get La:0.9 mol, Sm:0.1 mol, Gd:0.95 mol, and Ru:0.05 mol. That is, as shown in Table 1, the lanthanum nitrate [$La(NO_3)_3 \cdot 6H_2O$] of 389.7 g, the gadolinium nitrate [$Gd(NO_3)_3 \cdot 6H_2O$] of 428.5 g, the samarium nitrate [$Sm(NO_3)_3 \cdot 6H_2O$] of 44.4 g, and the ruthenium nitrate solution [$Ru(NO_3)_2$ solution.Ru concentration 3.6 wt %] of 140.4 g were weighed respectively, and then they were mixed with the pure water 1 L and then sufficiently stirred.

The above mixed solution was put into the autoclave while dissolving previously the ammonium hydrogencarbonate [$NH_4HCO_3$] of 640 g into the pure water 0.5 L and stirring them in the autoclave. After putting the total quantity into the autoclave, the autoclave was tightly sealed. And then about 120° C. steam was supplied into the autoclave while continuing to stir them. The pressure of steam was about 2 kg/cm². Then, such supply of the steam was stopped once at a point of time when the internal pressure came up to 1.1 kg/cm².

Subsequently, the reaction was carried out while adjusting an amount of the steam and maintaining internal pressure of the autoclave from 1.1 kg/cm² to 1.2 kg/cm². After two hours from the start of steam supply, the internal pressure became to be kept at 1.1 kg/cm² even if the supply of the steam was stopped. After the reaction was continued for 0.5 hour in this state, the stirring was stopped and also the tight sealing was released.

The slurry-like hydrate was taken out from the autoclave, and then the precipitate was recovered by sucking/filtering the hydrate. The recovered precipitate was rinsed by the pure water and then dried in the oven at 120° C. for 12 hours.

Then, the perovskite composite oxide powders were obtained by burning the dried powders in the air at 600° C. for 5 hours by virtue of the alumina crucible. The stoichiometric composition of the resultant perovskite composite oxide was $La_{0.9}Sm_{0.1}Ga_{0.95}Ru_{0.05}O_3$.

Next, the perovskite composite oxide impalpable powder slurry was obtained by grinding/mixing the resultant perovskite composite oxide powders 100 g and the 8 wt % nitric acid alumina sol (the mixed solution of the boehmite alumina 13 g and the 10 wt % nitric acid aqueous solution 87 g) 100 g for 2 hours by virtue of the planetary ball mill.

Then, the fuel forming catalyst A was formed by coating the resultant slurry on the ceramic monolithic substrate (400 cells, 0.119 cc) to get 100 g/L as the weight of the perovskite composite oxide, then drying it at 120° C. for 10 minutes, and then baking it in the air at 400° C.

As given in Table 2, amounts of respective elements per this forming catalyst A unit were La:4.25 g, Gd:5.19 g, Sm:0.52 g, and Ru:0.15 g. Also, as given in Table 3, the composition of the reforming catalyst was $La_{0.9}Sm_{0.1}Gd_{0.95}Ru_{0.05}O_3$. That is, the catalyst A in Example 1 was the reforming catalyst which was the perovskite composite oxide expressed by A'1-xA"xB'1-yB"yO3 and contains the catalyst composition having La on the A' site, Sm on the A" site, Gd on the B' site, and Ru on the B" site. As given in Table 3, an amount of remaining methanol by this catalyst A was 0.98% and the reformation rate was 99.02%, both detected under the test conditions described later.

EXAMPLE #2 TO EXAMPLE #17

In Examples 2 to 17, the catalyst B to the catalyst Q were formed by using the manufacturing method similar to Example 1, while changing catalyst composition ratios in compliance with the compositions given in Table 1. The compositions of respective catalyst and the remaining methanol amount and the reform rate of respective catalysts, which were detected under the test conditions described later, are given in Table 3.

COMPARATIVE EXAMPLE #1

In Comparative Example 1, the reforming catalyst X, in which the perovskite composite oxide was mainly used as the support and this support was impregnated with Ru having the catalytic activity, was formed like the reforming catalyst in the prior art.

First, the mixed solution was prepared by mixing La:0.8 mol, Sm:0.2 mol, and Gd:0.9 mol, i.e., the lanthanum nitrate 346.6 g, the samarium nitrate 88.9 g, and the gadolinium nitrate 428.5 g into the pure water 1 L, as shown in Table 1, and then stirring sufficiently them.

Then, the above mixed solution was put into the autoclave while dissolving previously the ammonium hydrogencarbonate [$NH_4HCO_3$] of 640 g into the pure water 0.5 L and stirring them in the autoclave. After putting the total quantity into the autoclave, the autoclave was tightly sealed and then the steam was supplied into the autoclave while continuing to stir them. The steam was about 120° C. and the pressure of the steam was 2 kg/cm$^2$.

Then, such supply of the steam was stopped once at a point of time when the internal pressure comes up to 1.1 kg/cm$^2$.

Subsequently, the reaction was carried out while adjusting an amount of the steam supply to maintain the internal pressure of the autoclave from 1.1 kg/cm$^2$ to 1.2 kg/cm$^2$. After two hours from the start of steam supply, the internal pressure became to be kept at 1.1 kg/cm even if the supply of the steam was stopped. After the reaction was continued for 0.5 hour in this state, the stirring was stopped and also the tight sealing was released.

The slurry-like hydrate was taken out from the autoclave, and then the precipitate was recovered by sucking/filtering the hydrate. The recovered precipitate was rinsed by the pure water and then dried in the oven at 120° C. for 12 hours.

Then, the perovskite composite oxide powders were obtained by burning the dried powders in the air at 600° C. for 5 hours by virtue of the alumina crucible.

The Ru-impregnated perovskite composite oxide powders were obtained by mixing the resultant perovskite composite oxide powders into the solution in which Ru:0.05 mol, i.e., the 3.6 wt % ruthenium nitrate solution 140.4 g was dissolved into the pure water 100 ml, then stirring sufficiently them, then drying them in the oven at 120° C. for 8 hours, and then baking them in the air at 400° C. for 2 hours.

Then, the Ru-impregnated perovskite composite oxide impalpable powder slurry was obtained by grinding/mixing the resultant Ru-impregnated perovskite composite oxide powders 100 g and the 8 wt % nitric acid alumina sol 100 g for 2 hours by virtue of the planetary ball mill. Then, the fuel reforming catalyst X was obtained by coating the resultant slurry on the ceramic monolithic substrate (400 cells, 0.119 cc) to get 100 g/L as the weight of the Ru-impregnated perovskite composite oxide, then drying it at 120° C. for 10 minutes, and then baking it in the air at 400° C.

As given in Table 2 of FIG. 7, amounts of respective elements per this reforming catalyst X unit were La:4.25 g, Gd:5.19 g, Sm:0.52 g, and Ru:0.15 g. Also, as given in Table 3 of FIG. 8, the reforming catalyst had the perovskite composite oxide that has the composition $La_{0.9}Sm_{0.1}Gd_{0.95}O_3$ and was impregnated with Ru as the catalyst activating substance. As given in Table 3 of FIG. 8, an amount of remaining methanol by this catalyst X was 2.62% and the reformation rate was 97.38%, both were detected under the test conditions described later.

COMPARATIVE EXAMPLE #2

The catalyst Y was obtained by preparing the slurry by using the perovskite composite oxide powders obtained in Comparative Example 1, then coating it on the ceramic monolithic substrate, and baking it at 400° C. That is, Comparative Example 2 was different from Comparative Example 1 in that the catalyst Y was not impregnated with the catalyst activating substance Ru. As given in Table 3, an amount of remaining methanol by this catalyst Y was 3.62% and the reformation rate was 96.36%, both were detected under the test conditions described later.

EXAMPLE #18 To #20

In Example 18, the perovskite composite oxide powder slurry was obtained by grinding/mixing the perovskite composite oxide powders made in Example 5, i.e., the $La_{0.8}Pr_{0.2}Fe_{0.8}Rh_{0.2}O_3$ powder 100 g and the 8 wt % silica sol for 5 hours by virtue of the planetary ball mill.

The electrode catalyst (a) was formed by coating uniformly the perovskite composite oxide powders slurry on the solid electrolyte substrate manufactured by the 15 cm-square yttria-stablized zirconium, then drying it at 50° C. for 12 hours and then sintering it in the air at 850° C. The amount of coating slurry contained 6.3 g of oxide.

In Examples 19 and 20, the electrode catalysts (b) (c) were produced by using the compositions of the perovskite composite oxide powders given in Table 4 under the same conditions as Example 18.

COMPARATIVE EXAMPLE #3

In Comparative Example 3, the electrode catalyst Z made of the perovskite composite oxide not containing Rh composition was formed. The compositions of this electrode catalyst (Z) were common to the electrode catalyst (a) in Example 18 except for Rh.

First, the mixed solution was prepared by mixing La:0.8 mol, Pr:0.2 mol, and Fe:0.8 mol, i.e., the lanthanum nitrate 346.4 g, the praseodymium nitrate 87 g, and the iron nitrate 323.2 g with the pure water 1 L and then stirring them sufficiently. The conditions following to this were the same as the processing conditions in Example 1, and the slurry-like hydrate was made by using the autoclave and then the precipitate was recovered by sucking/filtrating the hydrate. The recovered precipitate was rinsed by the pure water and then dried in the oven at 120° C. for 12 hours.

Then, the perovskite composite oxide powder was obtained by burning the dried powder in the air at 600° C. for 5 hours by using the alumina crucible.

The electrode catalyst (z) was formed by coating the resultant perovskite composite oxide powder on the solid electrolyte substrate by using the same method as Example 18, then drying it at 50° C. for 12 hours, and sintering it in the air at 850° C.

(Test 1)

As for the reforming catalysts that contain the perovskite composite oxide obtained in Examples 1 to 17 and Comparative examples 1, 2 as the catalytic composition, the reformation rates obtained by the steam reforming reaction using the methanol and the partial oxidation reaction were measured.

The methanol reforming reaction was made in compliance with following reactions. In this case, an amount of added steam was set to a theoretical amount, and an amount of oxygen was set to ⅓ of a theoretical amount.

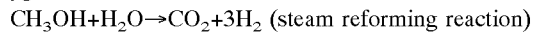
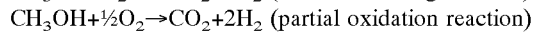

$CH_3OH+H_2O \rightarrow CO_2+3H_2$ (steam reforming reaction)
$CH_3OH+½O_2 \rightarrow CO_2+2H_2$ (partial oxidation reaction)

The reformation rate was calculated by measuring the remaining methanol amount by the gas chromatography (manufactured by Hitachi, Ltd.).

The reforming temperature was set to 400° C. at the catalyst inlet temperature, and LHSV (value of the supply liquid amount to the catalyst volume per unit time) was set to 2 hr?1. The results are given in Table 3.

As apparent from Table 3, according to the reforming catalysts A to Q which contain the oxide, in which the noble metals such as Rh, Ru, Pd, Pt, and the like were introduced into the B" site of the perovskite composite oxide crystal structure expressed by $A'_{1-x}A''_xB'_{1-y}B''_yO_3$, as the catalyst composition, the methanol remaining rate was reduced lower than ⅕ compared to the catalyst in which the perovskite composite oxide was impregnated only with Ru, like the reforming catalyst X in Comparative Example 1, and the catalyst in which the noble metals such as Ru, Rh, and the like were not contained, like the reforming catalyst Y in Comparative Example 2. Thus, the reforming performance was improved.

(Test 2)

Also, as for the electrode catalyst made of the perovskite composite oxide obtained in Examples 18 to 20 and Comparative example 3, the measurement of the electromotive force was made, and also the characteristic evaluation of respective electrode catalysts was made by setting the temperature, at which the electromotive force reaches the theoretical electromotive force given by the Nernst equation, as the operation starting temperature Tne (° C.).

Figure 5A:
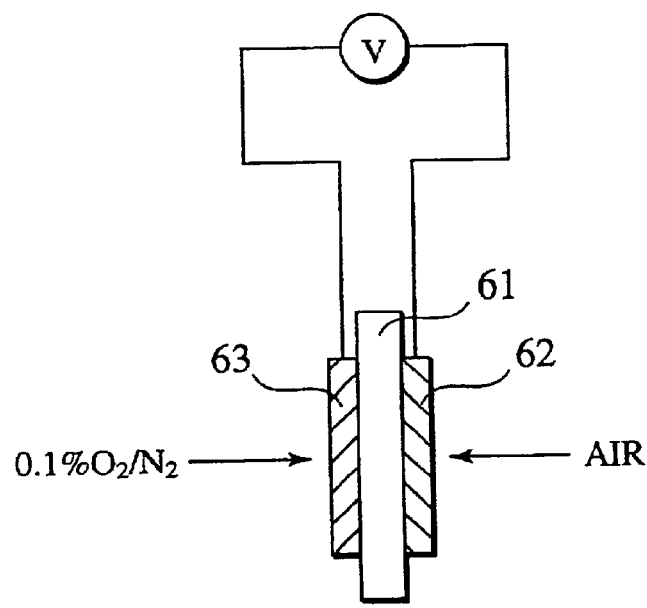
FIGS. 5A and 5B showing an evaluation system employed to execute the evaluation of the reforming catalyst in Examples and Comparative examples respectively.
Figure 5B:
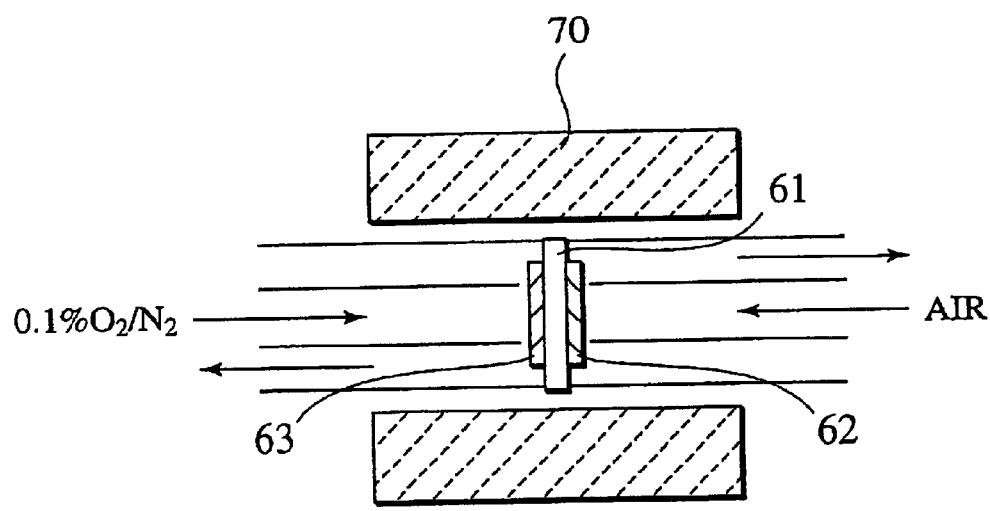

FIGS. 5A and 5B show a configuration of an evaluation system employed to execute the characteristic evaluation of the electrode catalyst. As shown in FIG. 5A, the basic unit of the solid oxide electrolyte fuel cell was prepared by forming the air electrode 62 made of the Pt electrode on one surface of the solid electrolyte substrate 61 made of yttria-stabilized zirconia and coating the electrode catalyst 63 in each Example on the other surface, and then the characteristic evaluation was made by using this basic unit.

The temperature was increased while flowing the air to the air electrode (Pt electrode) as one reference electrode and flowing the $N_2$ gas containing 0.1% $O_2$ to the fuel electrode (Pt electrode) as the other measuring electrode, and then the temperature at which the voltage between the air electrode (reference electrode) 62 and the electrode catalyst (measuring electrode) 63 reaches the theoretical electromotive force of the oxygen concentration cell was measured. In this case, as shown in FIG. 5B, the solid electrolyte fuel cell for the characteristic evaluation was put into the electric furnace, and then the temperature of the overall cell was adjusted by the electric furnace.

The results are given in Table 4.

As apparent from Table 4, the electrode catalysts A to Z, that contain Rh in the B" site in the perovskite composite oxide crystal structure expressed by $A'_{1-x}A''_xB'_{1-y}O_3$, make possible the operation of the cell at the lower temperature than the electrode catalyst Z that does not contain Rh. Also, according to the comparison between the electrode catalysts A to C, it can be found that the operation starting temperature is reduced as an amount of Rh in the electrode catalyst composition is increased more and more.

As described above, the catalyst composition according to the present invention, since the ionic conductivity and the valence control of the element in the B (B' and B") site in the perovskite composite oxide crystal, which makes an important contribution to the catalytic operation for the reforming reaction of the fuel such as the hydrocarbon, etc., were effectively performed, the high ionic conductivity and the good catalytic characteristic can be achieved. In addition, since the noble metals such as Ru, Rh, Pd, Pt, and the like are incorporated into the perovskite composite oxide crystal structure that is excellent in the durability and the heat resistance, these noble metals are dispersed excellently into the crystal and the stability of the atmosphere is achieved. In addition, the high activity can be maintained with good stability even in the high temperature and oxygen sufficient atmosphere such as the partial oxidation reaction as one of the reforming reactions, for example.

Also, if such catalyst composition of the present invention is employed as the reforming catalyst, the edution of carbon is prevented under the driving condition having the low steam/carbon ratio, and thus the hydrogen is produced economically for a long time by reforming the hydrocarbon-based gas.

In addition, if such catalyst composition is employed as the electrode catalyst, the sufficient endurance performance is provided against the change of the atmosphere at the start and the stop of the fuel cell.

The entire contents of Japanese Patent Application P2000-38461 (filed Feb. 16, 2000) are incorporated herein by reference.

Although the invention has been described above by reference to certain embodiments of the invention, the invention is not limited to the embodiments described above. Modifications and variations of the embodiments described above will occur to those skilled in the art in light of the above teachings.

In respective examples of the present invention, one type element is selected for the A', A", B', B" sites in the perovskite composite oxide crystal structure expressed by $A'_{1-x}A''_xB'_{1-y}B''_yO_3$ respectively. But each site may consist of two elements or more. For example, one B" site may be buried by Ru and another B" site may be buried by Rh.

TABLE 1

| Example No. | La-nitrate (g) | Pr-nitrate (g) | Gd-nitrate (g) | Ce-nitrate (g) | Sm-nitrate (g) | Fe-nitrate (g) | Ru-nitrate (3.6 wt % solution) | Rh-nitrate (8.5 wt % solution) | Pd-nitrate (8.5 wt % solution) | Pt-nitrate (8.5 wt % solution) |
|---|---|---|---|---|---|---|---|---|---|---|
| example 1 | 389.7 | — | 428.5 | — | 44.4 | — | 140.4 | — | — | — |
| example 2 | 346.4 | — | 428.5 | — | 88.8 | — | 140.4 | — | — | — |
| example 3 | — | — | 428.5 | 390.6 | 44.4 | — | 140.4 | — | — | — |
| example 4 | 389.7 | 43.5 | — | — | — | 323.2 | — | 240 | — | — |
| example 5 | 346.4 | 87.0 | — | — | — | 323.2 | — | 240 | — | — |
| example 6 | 303.1 | 130.5 | — | — | — | 323.2 | — | 240 | — | — |
| example 7 | 346.4 | 87.0 | — | — | — | 202 | — | 605 | — | — |
| example 8 | 346.4 | 87.0 | — | — | — | 80.8 | — | 968 | — | — |
| example 9 | 389.7 | 43.5 | — | — | — | 323.2 | 561.7 | — | — | — |
| example 10 | 346.4 | 87.0 | — | — | — | 323.2 | 561.7 | — | — | — |
| example 11 | 303.1 | 130.5 | — | — | — | 323.2 | 561.7 | — | — | — |
| example 12 | 346.4 | 87.0 | — | — | — | 202 | 1404 | — | — | — |
| example 13 | 346.4 | 87.0 | — | — | — | 80.8 | 2247 | — | — | — |
| example 14 | — | — | 360.8 | 347.2 | 88.9 | — | 561.7 | — | — | — |
| example 15 | — | — | 360.8 | 347.2 | 88.9 | — | — | 240 | — | — |
| example 16 | 346.4 | 87.0 | — | — | — | 80.8 | — | — | 1127 | — |
| example 17 | 346.4 | 87.0 | — | — | — | 80.8 | — | — | — | 1835 |
| Comparative example 1 | 389.7 | — | 428.5 | — | 44.4 | — | 140.4 | — | — | — |
| Comparative example 2 | 389.7 | — | 428.5 | — | 44.4 | — | — | — | — | — |

TABLE 2

| | | Amount of each element per a catalyst unit | | | | | | | | | |
|---|---|---|---|---|---|---|---|---|---|---|---|
| Example No. | Catalyst | La (g) | Pr (g) | Gd (g) | Ce (g) | Sm (g) | Fe (g) | Ru (g) | Rh (g) | Pd (g) | Pt (g) |
| example 1 | A | 4.25 | — | 5.19 | — | 0.52 | — | 0.15 | — | — | — |
| example 2 | B | 3.74 | — | 5.19 | — | 1.03 | — | 0.15 | — | — | — |
| example 3 | C | — | — | 5.19 | 4.08 | 1.03 | — | 0.15 | — | — | — |
| example 4 | D | 6.16 | 0.69 | — | — | — | 1.81 | — | 0.96 | — | — |
| example 5 | E | 5.47 | 1.38 | — | — | — | 1.81 | — | 0.96 | — | — |
| example 6 | F | 4.79 | 2.07 | — | — | — | 1.81 | — | 0.96 | — | — |
| example 7 | G | 5.47 | 1.38 | — | — | — | 1.07 | — | 2.29 | — | — |
| example 8 | H | 5.47 | 1.38 | — | — | — | 0.39 | — | 3.39 | — | — |
| example 9 | I | 6.16 | 0.69 | — | — | — | 1.81 | 0.90 | — | — | — |
| example 10 | J | 5.47 | 1.38 | — | — | — | 1.81 | 0.90 | — | — | — |
| example 11 | K | 4.79 | 2.07 | — | — | — | 1.81 | 0.90 | — | — | — |
| example 12 | L | 5.47 | 1.38 | — | — | — | 1.07 | 2.11 | — | — | — |
| example 13 | M | 5.47 | 1.38 | — | — | — | 0.39 | 3.14 | — | — | — |
| example 14 | N | — | — | 4.49 | 3.72 | 1.06 | — | 0.62 | — | — | — |
| example 15 | O | — | — | 4.49 | 3.72 | 1.06 | — | — | 0.70 | — | — |
| example 16 | P | 5.47 | 1.38 | — | — | — | 0.39 | — | — | 2.88 | — |
| example 17 | Q | 5.47 | 1.38 | — | — | — | 0.39 | — | — | — | 4.68 |
| Comparative example 1 | X | 4.25 | — | 5.19 | — | 0.52 | — | 0.15 | — | — | — |
| Comparative example 2 | Y | 4.25 | — | 5.19 | — | 0.52 | — | — | — | — | — |

TABLE 3

| Example No. | Catalyst | Catalyst composition | Amount of remaining MeOH (%) | Reformation rate (%) |
|---|---|---|---|---|
| example 1 | A | $La_{0.9} Sm_{0.1} Gd_{0.95} Ru_{0.05} O_3$ | 0.98 | 99.02 |
| example 2 | B | $La_{0.8} Sm_{0.2} Gd_{0.95} Ru_{0.05} O_3$ | 0.96 | 99.04 |
| example 3 | C | $Ce_{0.9} Sm_{0.1} Gd_{0.95} Ru_{0.05} O_3$ | 1.02 | 98.98 |
| example 4 | D | $La_{0.9} Pr_{0.1} Fe_{0.8} Ru_{0.2} O_3$ | 0.54 | 99.46 |
| example 5 | E | $La_{0.8} Pr_{0.2} Fe_{0.8} Ru_{0.2} O_3$ | 0.48 | 99.52 |
| example 6 | F | $La_{0.7} Pr_{0.3} Fe_{0.8} Ru_{0.2} O_3$ | 0.40 | 99.60 |
| example 7 | G | $La_{0.8} Pr_{0.2} Fe_{0.5} Ru_{0.5} O_3$ | 0.37 | 99.63 |
| example 8 | H | $La_{0.8} Pr_{0.2} Fe_{0.2} Ru_{0.8} O_3$ | 0.23 | 99.77 |
| example 9 | I | $La_{0.9} Pr_{0.1} Fe_{0.8} Ru_{0.2} O_3$ | 0.72 | 99.28 |
| example 10 | J | $La_{0.8} Pr_{0.2} Fe_{0.8} Ru_{0.2} O_3$ | 0.68 | 99.32 |
| example 11 | K | $La_{0.7} Pr_{0.3} Fe_{0.8} Ru_{0.2} O_3$ | 0.51 | 99.49 |
| example 12 | L | $La_{0.8} Pr_{0.2} Fe_{0.5} Ru_{0.5} O_3$ | 0.46 | 99.54 |
| example 13 | M | $La_{0.8} Pr_{0.2} Fe_{0.2} Ru_{0.8} O_3$ | 0.38 | 99.62 |
| example 14 | N | $Ce_{0.8} Sm_{0.2} Gd_{0.8} Ru_{0.2} O_3$ | 0.65 | 99.35 |
| example 15 | O | $Ce_{0.9} Sm_{0.2} Gd_{0.8} Ru_{0.2} O_3$ | 0.53 | 99.47 |
| example 16 | P | $La_{0.8} Pr_{0.2} Fe_{0.2} Pd_{0.8} O_3$ | 0.37 | 99.63 |
| example 17 | Q | $La_{0.8} Pr_{0.2} Fe_{0.2} Pt_{0.8} O_3$ | 0.40 | 99.60 |
| Comparative example 1 | X | $La_{0.9} Sm_{0.1} Gd_{0.95} O_3$/Ru* | 2.62 | 97.38 |

TABLE 3-continued

| Example No. | Catalyst | Catalyst composition | Amount of remaining MeOH (%) | Reformation rate (%) |
|---|---|---|---|---|
| Comparative example 2 | Y | $La_{0.9} Sm_{0.1} Gd_{0.95} O_3$ | 3.64 | 96.36 |

*The Ru impregnated into the perovskite composite composite oxide.

TABLE 4

| Example No. | Composition of electrode-catalyst | Electrode-catalyst | Temperature of starting Operation Tne (° C.) |
|---|---|---|---|
| example 18 | $La_{0.8} Pr_{0.2} Fe_{0.8} Rh_{0.2} O_3$ | a | 420 |
| example 19 | $La_{0.8} Pr_{0.2} Fe_{0.5} Rh_{0.5} O_3$ | b | 405 |
| example 20 | $La_{0.8} Pr_{0.2} Fe_{0.2} Rh_{0.8} O_3$ | c | 387 |
| Comparative example 3 | $La_{0.8} Pr_{0.2} Fe_{0.8} O_3$ | z | 650 |

What is claimed is:

1. A fuel cell comprising:

a solid electrolyte substrate;

an electrode catalyst adhered onto one surface of the solid electrolyte substrate and having a catalyst composition;

an air electrode adhered onto the other surface of the solid electrolyte substrate; and the catalyst composition comprises: a perovskite composite oxide of the type expressed by a rational formula $ABO_3$; the rational formula $ABO_3$ is expressed by a formula $A'_{1-x}A''_{x}B'_{1-y}B''_{y}O_3$, and the A' is La or Ce or both of them, the A" is at least one element selected from the group consisting of La, Ca, Sm, Ce, Sr, Ba and Pr, the B' is at least one element selected from the group consisting of Co, Fe, Mn and Gd, and the B" is at least one element of noble metals; and the x is set in a range of 0.1<x<0.5, and they is set in a range of 0.05<y<1.

* * * * *